United States Patent
Bubenhofer et al.

(10) Patent No.: US 7,845,488 B2
(45) Date of Patent: Dec. 7, 2010

(54) COIN HOLDER

(75) Inventors: Max Bubenhofer, Dingolfing (DE); Robert Pusl, Moosburg (DE); Michael Windl, Landshut (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 369 days.

(21) Appl. No.: 11/361,696

(22) Filed: Feb. 24, 2006

(65) Prior Publication Data

US 2006/0207892 A1 Sep. 21, 2006

(30) Foreign Application Priority Data

Feb. 25, 2005 (DE) .................. 10 2005 008 731

(51) Int. Cl.
*A45C 1/00* (2006.01)
(52) U.S. Cl. ........................ 206/0.84; 206/0.8
(58) Field of Classification Search ............... 206/0.8, 206/0.81, 0.82, 0.83, 0.84, 445, 480, 564, 206/0.815, 344, 348; 150/136, 150–153
See application file for complete search history.

(56) References Cited

U.S. PATENT DOCUMENTS

| 1,378,227 | A | * | 5/1921 | Greenstreet | 206/0.8 |
|---|---|---|---|---|---|
| 2,083,117 | A | * | 6/1937 | Cunningham | 206/0.82 |
| 2,119,832 | A | * | 6/1938 | Schless | 206/562 |
| 2,561,687 | A | * | 7/1951 | Keen et al. | 206/0.81 |
| 2,684,820 | A | * | 7/1954 | Korn | 248/450 |
| 3,138,244 | A | * | 6/1964 | White | 206/0.81 |
| 3,776,643 | A | * | 12/1973 | Titoff | 356/244 |
| 3,837,475 | A | * | 9/1974 | Bolanz | 206/0.8 |
| 3,945,491 | A | * | 3/1976 | Lindenbaum | 206/0.81 |
| 4,796,756 | A | * | 1/1989 | Ott | 206/454 |
| 6,033,004 | A | | 3/2000 | Stryker et al. | |
| 6,736,261 | B1 | * | 5/2004 | Thomas et al. | 206/265 |
| 6,837,375 | B2 | * | 1/2005 | Whalen et al. | 206/454 |

FOREIGN PATENT DOCUMENTS

DE 70 07 445 U 2/1970
DE 31 21 952 A1 12/1982

* cited by examiner

*Primary Examiner*—Jila M Mohandesi
*Assistant Examiner*—Sharon M Prange
(74) *Attorney, Agent, or Firm*—Wolf, Greenfield & Sacks, P.C.

(57) ABSTRACT

A coin holder with a plurality of coin accommodation openings is disclosed. Each coin opening comprises a clamp spring pair formed by two opposing sidewalls acting as clamp springs. Each clamp spring pair comprises at least two clamp regions with differently spaced clamp surfaces each for the clamping accommodation of coins having different thickness. Coins of different thicknesses are held in their respective clamp region, whereby thicker coins are held in the upper portion of the coin accommodation opening, while thinner coins are inserted more deeply and thus held in the lower portion of the coin accommodation opening. The coin holder can be used for various currencies, without the need for country-specific variations.

17 Claims, 1 Drawing Sheet

COIN HOLDER

BACKGROUND

1. Field

Aspects of the invention relate to coin holders and in particular coin holders for vehicles.

2. Discussion of Related Art

Many motor vehicles include coin holders as standard equipment. These coin holders are located in easy to reach places in the passenger area, for example in the center console. Such coin holders provide simple and quick availability of change for the driver, yet store the change in a stable and silent manner.

A coin holder is known, for example, from U.S. Pat. No. 6,033,004. The '004 patent discloses a coin holder having several parallel openings for the accommodation of the coins. These openings include two opposing sidewalls of substantially the same height and a concave wall confining the opening in radial relation to the inserted coins. An elastic spring carrier projects from a sidewall and presses the inserted coin against the opposite sidewall. The coin is thus held in the coin opening.

A similar solution is disclosed in DE 31 21 952 A1. However, here, the coin accommodation openings are not parallel, but rather aligned in rows next to each other. The coin holder includes a sidewall being formed as a spring tab, the base of which is joined with the base of the coin holder. The other sidewall includes a recess that allows for the extraction of the coin with a fingertip.

In both above-described solutions, only coins of certain pre-determined thicknesses are satisfactorily held, whereas securing very thick or very thin coins is problematic. In addition, the insertion depth is constant and thus these coin holders cannot accommodate coins of different diameters. In particular, large diameter coins often have a smaller thickness than that of small diameter coins. Due to this, coins with smaller diameters sink deeper in the coin receptacle and, if they come to lie next to other coins, it becomes difficult to remove them.

SUMMARY

In one illustrative embodiment, a coin holder is provided. The coin holder includes a plurality of coin accommodation openings, each having a clamp spring pair formed by two opposite clamp springs. Each clamp spring pair has at least two clamp regions with differently spaced clamp surfaces each. In this manner clamping of coins having different thickness can be accommodated.

In another illustrative embodiment, a coin holder is provided. The coin holder includes a body and a plurality of coin receptacles formed in the body. Each coin receptacle has opposing spaced apart sidewalls. The sidewalls are constructed and arranged to define at least two clamp regions. A first spacing between the sidewalls in a first clamp region is different from a second spacing between the sidewalls in a second clamp region.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
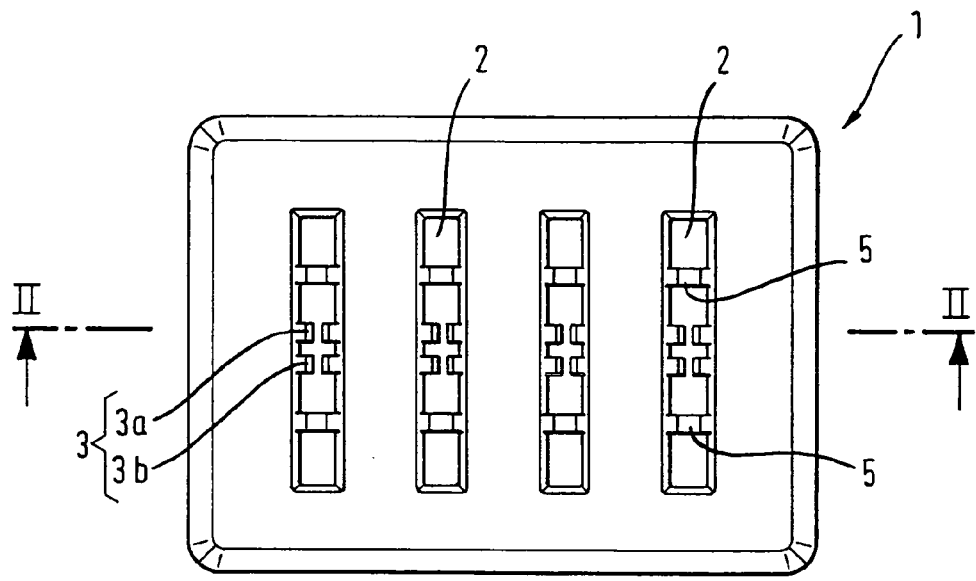
FIG. 1 is a top view of a coin holder according to one embodiment of the invention.

Aspects of the invention relate to a coin holder for the accommodation of coins of different sizes (e.g., different thicknesses and/or different diameters). In one aspect, the coin holder is constructed to receive coins in a secure and relatively quiet manner. In one aspect, removal of coins from the coin holder is efficient.

In one embodiment, the coin holder includes a plurality of coin accommodation openings that each comprises a clamp spring pair formed by two opposing clamp springs. Each clamp spring pair may comprise at least two clamp regions with different spaced clamp surfaces each for the clamping accommodation of coins of different thickness.

In one embodiment, the clamping surfaces of the clamp spring pair are stepped and thus form separate clamping regions. Other suitable sloped arrangements may be employed, as the present invention is not limited in this respect to a stepped surface. Furthermore, in one embodiment, the space of the clamping surfaces of the clamp spring pair is tapered in the insertion direction. In this manner, coins of varying width are held in their respective clamp region, whereby thicker coins are held in the upper part of the coin accommodation opening, while thinner coins are inserted more deeply and are accordingly held in the lower part. Accordingly, the coin holder may be used for various currencies, without the need for country-specific versions of the coin holder.

In one embodiment, the lower portion of the coin accommodation opening is formed broken through in the coin insertion direction so that the coin accommodation opening can be used as an airing slit, as desired. Of course, the present invention is not limited in this regard, as the lower end of the coin accommodation opening may be closed.

In order to prevent the coins from falling into the area beneath the coin holder if the coins were inserted too deep, in one embodiment, a stop is provided in the coin accommodation opening limiting the maximum insertion depth of a coin.

The coin holder may be formed in any suitable manner, as the present invention is not limited in this respect. In one embodiment, the coin holder is formed as an integral piece. The coin holder may be formed by any suitable manufacturing method using any suitable material, as the present invention is not limited in this respect. In one embodiment, the coin holder is manufactured by injection molding. In one embodiment, the coin holder is formed of a material that provides a desired elasticity and provides a suitably sufficient lifespan and durability in relation to the typical temperature swings of the vehicle interior. In one embodiment, the coin holder is formed of plastic.

The coin holder may be made in a manner such that no additional manufacturing step is required once the coin holder is formed, that is no further assembly or parts are necessary in order to obtain certain features and/or advantages of the coin holder. For example, the coin holder may be formed as a completed unit upon removal from a mold, whereby the desired features of the coin holder are molded therein. Only minor secondary operations may need to be performed on the coin holder, such as removing any flash and/or the gate material; however, because the desired features are formed in the molded component, the coin holder may be considered to be an "out-of-tool" part. Other suitable manufacturing processes resulting in a unit that is ready to use may also be employed, as the present invention is not limited in this regard to a molding operation. Forming the coin holder in a process whereby the features are integrally formed allows the coin holder to be used in a variety of applications and supporting structures without necessarily compensating for the geometry of those applications and/or structures. Of course, the coin holder need not be so formed, as the present invention also contemplates multi-step manufacturing processes and/or processes whereby assembly of component parts is required.

Turning now to the figures, one illustrative embodiment will now be described. FIG. 1 is a top view of an embodiment of a coin holder. The coin holder includes a substantially rectangular body 1, although any suitably shaped body may be employed, as the present invention is not limited in this regard. The body 1 includes a plurality of slots or receptacles as coin accommodation openings 2. In this example, four coin accommodation openings are shown, although any number of coin accommodation openings may be employed, as the present invention is not limited in this regard. Each coin accommodation opening 2 is laterally delimited by a clamp spring pair 3, 4, a clamp spring, for example, being defined by two individual spring-elastic tabs 3a, 3b. The surfaces of a clamp spring facing the interior of the coin accommodation opening 2 form a clamp surface, and opposite clamp surfaces thus define a clamp region of the clamp spring pair.

Figure 2:
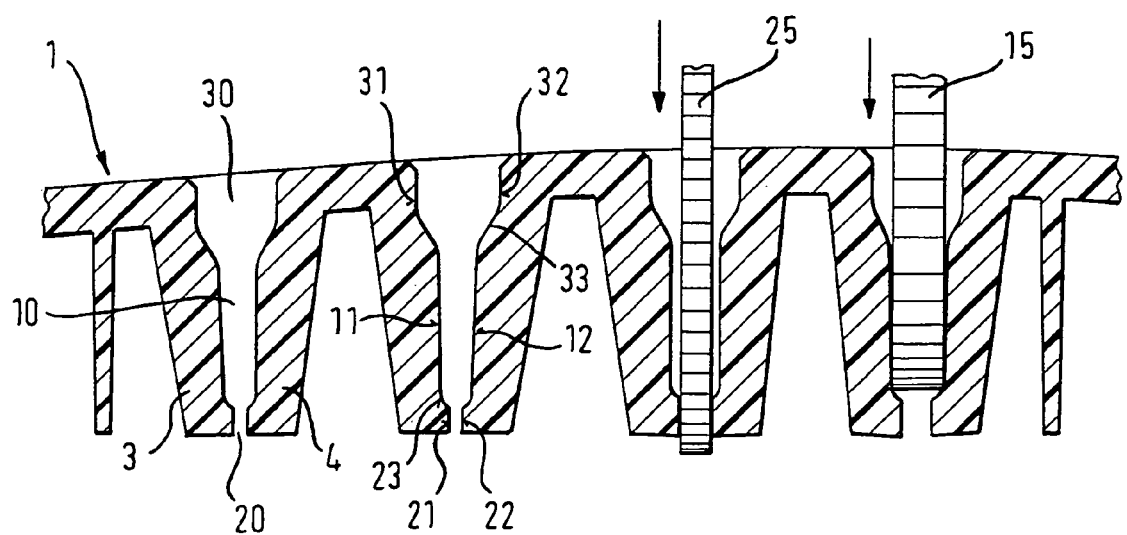
FIG. 2 is a cross-sectional view of the coin holder taken along line II-II of FIG. 1.

As shown in the illustrative embodiment of FIG. 2, each clamp spring pair is formed in a stepped manner, so that it forms at least two clamp regions 10, 20 and therefore at least two pairs of opposing clamp surfaces 11, 12, and 21, 22 are provided. In one embodiment, the stepped surface is formed as taper 23.

In one embodiment, the lower clamp region 20 in the insertion direction (arrow) has a smaller space between the opposing clamp surfaces in comparison to the upper clamp region 10, so that a thinner coin 25 may be held in the lower clamp region, while a thicker coin 15 may be held in the upper region. The spaces between the opposing clamp regions are each dimensioned (when measured without a coin inserted therein) such that they are at least slightly smaller than the thickness of the thinnest coin to be provided for that clamp region. In one embodiment, the clamp surfaces 11, 12 and 21, 22 are arranged such that they taper in the insertion direction.

The clamp surfaces 11, 12 of the upper clamp region 10 can extend up to the upper edge of the coin accommodation opening 2, thereby forming two clamp regions. However, the present invention is not limited in this regard as additional clamp regions may be formed.

In one embodiment, as shown in FIG. 2, a further region 30, which is wider than the widest expected coin, is formed. The sidewalls 31, 32 thereof also slowly taper and transfer into the clamp surfaces of the upper clamp region via a taper 33. As mentioned, additional clamp regions may be included and thus region 30 may be formed to accept a coin of yet another thickness, rather than merely as an entrance to the other clamp regions. In one embodiment, the upper edge of the coin accommodation opening 2 includes a rounded rim.

The lower portion of the lower clamp region 20 may include an opening. As such, a stop 5 may be provided to reduce the likelihood of a coin falling beneath the coin holder.

During the insertion of a coin, the coin is first guided into the region 30 and comes into contact with the taper 33, if it is a thick coin 15. In the case of a thin coin, it penetrates into the upper clamp region and comes into contact with the taper 23. The clamp springs 3, 4 are pressed open by the insertion pressure against the taper 33 or taper 23, and the coin is guided into the designated clamp region 10 or 20. The sidewalls, acting as clamp springs, press on the coins via the clamp surfaces 11, 12, or 21, 22, due to their bias, and thus securely hold the coin.

Should the coin be further pressed down, the perimeter thereof may abut against the stop 5 and thus is prevented from falling into the region under the coin holder. Because the stop is not placed in the middle of the coin accommodation opening, a coin may be inserted to securely hold a thin coin between the clamp springs.

As mentioned, in one embodiment, the components/features of the coin holder described above may all be formed integrally with the body 1 and made in one working step. In one embodiment, the entire coin holder is produced of a suitable plastic, such as polypropylene, although other suitable materials may be employed, as the present invention is not limited in this respect.

In one embodiment, a coin accommodation opening may be formed by the horizontal section of a substantially U-shaped insert fixed with the tips of its sides onto the longitudinal upper edge of the coin accommodation opening.

The foregoing written specification is to be considered to be sufficient to enable one skilled in the art to practice the invention. While the best mode for carrying out the invention has been described in detail, those skilled in the art to which this invention relates will recognize various alternative embodiments including those mentioned above as defined by the following claims. The examples disclosed herein are not to be construed as limiting of the invention as they are intended merely as illustrative of particular embodiments of the invention as enabled herein. Therefore, systems and methods that are functionally equivalent to those described herein are within the spirit and scope of the claims appended hereto. Indeed, various modifications of the invention in addition to those shown and described herein will become apparent to those skilled in the art from the foregoing description and fall within the scope of the appended claims.

What is claimed is:

1. A coin holder comprising:
a plurality of coin accommodation openings, each opening defined by a clamp spring pair formed by two opposing clamp springs, each clamp spring pair comprising a plurality of separate regions including a coin insertion region and at least two clamp regions, each clamp spring pair including a first transition between the coin insertion region and the clamp regions and a second transition between the two clamp regions, the coin insertion region and the clamp regions being formed with stepped surfaces of the clamp spring pair, each region including differently spaced surfaces with the clamp regions having differently spaced clamp surfaces adapted to clamp coins having different thicknesses between the two opposing clamp springs by a first of the opposing clamp springs adapted to press against a face of a coin and a second of the opposing clamp springs adapted to press against an opposite face of the coin, the clamp surfaces of a clamp region being spaced apart a distance less than a corresponding thickness of the coin to be clamped between the clamp surfaces of the clamp region, the clamp surfaces of the clamp region adapted to hold the coin across the thickness of the coin, wherein a through opening is formed at a lower clamp region opposite the coin insertion region.

2. The coin holder according to claim 1, wherein the space between the clamp surfaces of the clamp spring pair tapers in an insertion direction.

3. The coin holder according to claim 1, wherein the coin accommodation openings comprise a stop adapted to limit an insertion depth of a coin.

4. The coin holder according to claim 1, wherein the coin holder is formed integrally.

5. The coin holder according to claim 1, wherein the coin holder is produced of plastic.

6. The coin holder according to claim 1, wherein the coin holder is produced by injection molding.

7. The coin holder according to claim 1, wherein the coin holder is produced as an out-of-tool part.

8. The coin holder according to claim 1, wherein the coin insertion region includes a third clamp region.

9. A coin holder comprising:

a body; and a plurality of coin receptacles formed in the body, each coin receptacle having opposing spaced apart sidewalls, the sidewalls being constructed and arranged to define a plurality of separate regions including a coin insertion region and at least two clamp regions such that the sidewalls press on opposite faces of a coin, the sidewalls including a first transition from the coin insertion region to a first clamp region and a second transition from the first clamp region to a second clamp region, each sidewall including a stepped surface, each sidewall with a corresponding stepped surface cooperating to define the coin insertion region and the first and second clamp regions, a first spacing between the sidewalls in the first clamp region being different from a second spacing between the sidewalls in the second clamp region, a spacing between the sidewalls in the coin insertion region being different from the first and second spacings, the sidewalls in a clamp region being spaced apart a distance less than a corresponding thickness of the coin to be clamped between the sidewalls in the clamp region, the sidewalls in the clamp region cooperating and adapted to hold the coin across the thickness of the coin, wherein a through opening is formed at a lower clamp region opposite the coin insertion region.

10. The coin holder according to claim 9, wherein the stepped surface of each sidewall tapers toward each other in an insertion direction.

11. The coin holder according to claim 9, further comprising a stop cooperating with a receptacle, the stop adapted to limit an insertion depth of a coin.

12. The coin holder according to claim 9, wherein the body and each sidewall is integrally formed.

13. The coin holder according to claim 9, wherein the body and each sidewall is formed of plastic.

14. The coin holder according to claim 9, wherein the body and each sidewall is produced by injection molding.

15. The coin holder according to claim 9, wherein the coin insertion region includes a third clamp region.

16. A coin holder comprising:

a body; and a plurality of coin receptacles formed in the body, each coin receptacle having opposing spaced apart sidewalls, the sidewalls being constructed and arranged to define a plurality of separate regions including a coin insertion region and at least two clamp spring regions, a first spacing between the sidewalls in a first clamp spring region being different from a second spacing between the sidewalls in a second clamp spring region, a spacing between the sidewalls in the coin insertion region being greater than the first and second spacings, the sidewalls including a first transition between the coin insertion region and the first clamp spring region and a second transition between the first clamp spring region and the second clamp spring region, each sidewall including a stepped surface, each sidewall with a corresponding stepped surface cooperating to define the coin insertion region and the first and second clamp spring regions, wherein each sidewall is spring biased toward each other such that the sidewalls are adapted to cooperate and press on opposite faces of a coin and adapted to hold the coin across the thickness of the coin, the sidewalls in a clamp spring region being spaced apart a distance less than a corresponding thickness of the coin to be clamped between the sidewalls in the clamp spring region, wherein the sidewalls taper toward each other in an insertion direction.

17. The coin holder according to claim 16, wherein the coin insertion region includes a third clamp spring region.

* * * * *